(12) United States Patent
Clere

(10) Patent No.: US 6,794,435 B2
(45) Date of Patent: Sep. 21, 2004

(54) AGGLOMERATED HEXAGONAL BORON NITRIDE POWDERS, METHOD OF MAKING, AND USES THEREOF

(75) Inventor: Thomas M. Clere, Orchard Park, NY (US)

(73) Assignee: Saint Gobain Ceramics & Plastics, Inc., Worcester, MA (US)

(*) Notice: Subject to any disclaimer, the term of this patent is extended or adjusted under 35 U.S.C. 154(b) by 207 days.

(21) Appl. No.: 09/860,925

(22) Filed: May 18, 2001

(65) Prior Publication Data

US 2002/0006373 A1 Jan. 17, 2002

Related U.S. Application Data

(60) Provisional application No. 60/205,272, filed on May 18, 2000.

(51) Int. Cl.[7] .......................... B32B 5/16; C01B 21/064; B02C 19/00
(52) U.S. Cl. ...................... 524/404; 241/24.1; 423/290; 428/402
(58) Field of Search .................. 423/290; 241/24.1; 524/404; 428/402

(56) References Cited

U.S. PATENT DOCUMENTS

| | | |
|---|---|---|
| 4,107,276 A | 8/1978 | Schwetz et al. |
| 4,188,194 A | 2/1980 | Corrigan |
| 4,195,002 A | 3/1980 | Radtke et al. |
| 4,514,370 A | 4/1985 | Inoue et al. |
| 4,634,640 A | 1/1987 | Hunold et al. |
| 4,731,311 A | 3/1988 | Suzuki et al. |
| 4,801,445 A | 1/1989 | Fukui et al. |
| 4,863,881 A | 9/1989 | Ahrens et al. |
| 4,869,954 A | 9/1989 | Squitieri |
| 4,882,225 A | 11/1989 | Fukui et al. |

(List continued on next page.)

FOREIGN PATENT DOCUMENTS

| | | |
|---|---|---|
| DE | 39 17 726 A1 | 7/1990 |
| EP | 0 279 769 A2 | 8/1988 |
| EP | 0432007 | * 11/1990 |
| EP | 0 939 066 A1 | 9/1999 |
| EP | 0 982 391 A1 | 3/2000 |

(List continued on next page.)

OTHER PUBLICATIONS

Hagio et al., "Sintering of the Mechanochemically Activeted Powders of Hexagonal Boron Nitride," *J. Am. Ceram. Soc.*, 72(8):1482–84 (1989), (no month).

(List continued on next page.)

*Primary Examiner*—Wayne A. Langel
(74) *Attorney, Agent, or Firm*—Nixon Peabody LLP

(57) ABSTRACT

The present invention relates to a powder including agglomerates of hexagonal boron nitride platelets, wherein the agglomerates have an agglomerate size distribution of from about 10 to about 125 microns and the powder is substantially free of non-agglomerated platelets of boron nitride and its use in a polymer blend. The present invention also relates to a method of making a powder including agglomerates of hexagonal boron nitride platelets. This method involves providing a briquette formed from agglomerated hexagonal boron nitride platelets, crushing the briquette to produce a powder including hexagonal boron nitride agglomerates and non-agglomerated boron nitride platelets, and removing the non-agglomerated boron nitride platelets from the powder under conditions effective to produce a powder including agglomerates of hexagonal boron nitride platelets having an agglomerate size distribution of from about 10 to about 125 microns.

35 Claims, 1 Drawing Sheet

U.S. PATENT DOCUMENTS

| | | | |
|---|---|---|---|
| 4,927,587 A * | 5/1990 | Takahashi et al. | 524/404 |
| 4,997,633 A | 3/1991 | Koshida et al. | |
| 5,001,091 A | 3/1991 | Pujari et al. | |
| 5,011,870 A | 4/1991 | Peterson | |
| 5,039,435 A | 8/1991 | Hanano | |
| 5,064,589 A | 11/1991 | Ichikawa et al. | |
| 5,098,609 A | 3/1992 | Iruvanti et al. | |
| 5,116,589 A | 5/1992 | Hoenig | |
| 5,194,480 A | 3/1993 | Block et al. | |
| 5,213,868 A | 5/1993 | Liberty et al. | |
| 5,229,339 A | 7/1993 | Pujari et al. | |
| 5,234,712 A | 8/1993 | Howard | |
| 5,283,542 A | 2/1994 | Ochiai et al. | |
| 5,285,108 A | 2/1994 | Hastings et al. | |
| 5,298,791 A | 3/1994 | Liberty et al. | |
| 5,312,571 A | 5/1994 | Pujari et al. | |
| 5,374,036 A | 12/1994 | Rogers et al. | |
| 5,466,269 A | 11/1995 | Corrigan et al. | |
| 5,466,400 A | 11/1995 | Pujari et al. | |
| 5,508,110 A | 4/1996 | Howard | |
| 5,510,174 A | 4/1996 | Litman | |
| 5,525,557 A | 6/1996 | Pujari et al. | |
| 5,528,462 A | 6/1996 | Pendse | |
| 5,545,473 A | 8/1996 | Ameen et al. | |
| 5,567,353 A | 10/1996 | Bogan, Jr. | |
| 5,571,760 A | 11/1996 | Pujari et al. | |
| 5,591,034 A | 1/1997 | Ameen et al. | |
| 5,593,773 A | 1/1997 | McKay et al. | |
| 5,601,874 A | 2/1997 | Howard et al. | |
| 5,660,917 A | 8/1997 | Fujimori et al. | |
| 5,681,883 A | 10/1997 | Hill et al. | |
| 5,688,457 A | 11/1997 | Buckmaster et al. | |
| 5,696,041 A | 12/1997 | Collins et al. | |
| 5,738,936 A | 4/1998 | Hanrahan | |
| 5,759,481 A | 6/1998 | Pujari et al. | |
| 5,781,412 A | 7/1998 | de Sorgo | |
| 5,849,316 A | 12/1998 | Mellul et al. | |
| 5,854,155 A * | 12/1998 | Kawasaki et al. | 423/290 |
| 5,898,009 A | 4/1999 | Shaffer et al. | |
| 5,907,474 A | 5/1999 | Dolbear | |
| 5,908,796 A | 6/1999 | Pujari et al. | |
| 5,926,371 A | 7/1999 | Dolbear | |
| 5,950,066 A | 9/1999 | Hanson et al. | |
| 5,981,641 A | 11/1999 | Takahashi et al. | |
| 5,985,228 A | 11/1999 | Corrigan et al. | |
| 6,048,511 A | 4/2000 | Shaffer et al. | |
| 6,110,527 A | 8/2000 | Brun et al. | |
| 6,158,894 A | 12/2000 | Pujari et al. | |
| 6,162,849 A * | 12/2000 | Zhuo et al. | 524/404 |
| 6,168,859 B1 | 1/2001 | Mills et al. | |
| 6,255,376 B1 | 7/2001 | Shikata et al. | |
| 6,284,817 B1 | 9/2001 | Cross et al. | |
| 6,319,602 B1 | 11/2001 | Fauzi et al. | |
| 6,541,111 B2 * | 4/2003 | Fauzi et al. | 428/402 |
| 6,548,152 B2 | 4/2003 | Nakatani et al. | |
| 2001/0021740 A1 * | 9/2001 | Lodyga et al. | |

FOREIGN PATENT DOCUMENTS

| | | |
|---|---|---|
| GB | 2 301 818 A | 12/1996 |
| JP | 04321506 A2 | 11/1992 |
| JP | 07157369 A2 | 6/1995 |
| JP | 09151324 A | 6/1997 |
| JP | 10204300 A | 8/1998 |
| JP | 11005907 A2 | 1/1999 |
| JP | 11134944 A | 5/1999 |

OTHER PUBLICATIONS

Carborundum Boron Nitride Data sheet, "Cosmetic Grade Boron Nitride Powders" (6/98).

"Silicones & Silicon–Containing Polymers," *Petrarch Systems Silanes and Silicones: Silicon Compounds Register & Review*(1987), (no month).

Phone Call Report (Oct. 20, 1998) shipment information for XP1115 and Experimental Product Analysis (Oct. 23, 1998).

Quotation (May 19, 1999) and Experimental Product Analysis for XP1104 (May 18, 1999).

* cited by examiner

AGGLOMERATED HEXAGONAL BORON NITRIDE POWDERS, METHOD OF MAKING, AND USES THEREOF

The present application claims the benefit of U.S. Provisional Patent Application Ser. No. 60/205,272, filed May 18, 2000, which is hereby incorporated by reference in its entirety.

FIELD OF THE INVENTION

The present invention relates to a powder including agglomerated hexagonal boron nitride platelets, a method of making the powder, and its use in a polymer blend.

BACKGROUND OF THE INVENTION

Microelectronic devices, such as integrated circuit chips, are becoming smaller and more powerful. The current trend is to produce integrated chips which are steadily increasing in density and perform many more functions in a given period of time over predecessor chips. This results in an increase in the electrical current used by these integrated circuit chips. As a result, these integrated circuit chips generate more ohmic heat than the predecessor chips. Accordingly, heat management has become a primary concern in the development of electronic devices.

Typically, heat generating sources or devices, such as integrated circuit chips, are mated with heat sinks to remove heat which is generated during their operation. However, thermal contact resistance between the source or device and the heat sink limits the effective heat removing capability of the heat sink. During assembly, it is common to apply a layer of thermally conductive grease, typically a silicone grease, or a layer of a thermally conductive organic wax to aid in creating a low thermal resistance path between the opposed mating surfaces of the heat source and the heat sink. Other thermally conductive materials are based upon the use of a binder, preferably a resin binder, such as, a silicone, a thermoplastic rubber, a urethane, an acrylic, or an epoxy, into which one or more thermally conductive fillers are distributed.

Typically, these fillers are one of two major types: thermally conductive, electrically insulative or thermally conductive, electrically conductive fillers. Aluminum oxide, magnesium oxide, zinc oxide, aluminum nitride, and boron nitride are the most often cited types of thermally conductive, electrically insulative fillers used in thermal products. Boron nitride is especially useful in that it has excellent heat transfer characteristics and is relatively inexpensive.

However, in order to achieve sufficient thermal conductivity with presently used fillers, such as boron nitride, it has been necessary to employ high loadings of filler in the binder (see, e.g., U.S. Pat. Nos. 5,898,009, 6,048,511, and European Patent No. EP 0 939 066 A1, all to Shaffer et al., which teach an alternate methodology to achieve solids hexagonal boron nitride loading approaching 45 vol. %. This method involves: (a) crushing high purity hexagonal boron nitride powder into particles extending over a size range of at least 100 microns, (b) cold pressing the crushed particles into a compacted form, (c) granulating the compacted form into a granulated powder, and (d) cold pressing the resulting powder, with the operations of cold pressing and granulation occurring in one or more stages).

Thus, there is a need for thermally conductive filler materials which can be used at low loading levels to achieve sufficient thermal conductivity. The present invention is directed to overcoming this deficiency in the art.

SUMMARY OF THE INVENTION

The present invention relates to a powder including agglomerates of hexagonal boron nitride platelets, wherein the agglomerates have an agglomerate size distribution of from about 10 to about 125 microns and the powder is substantially free of non-agglomerated platelets of boron nitride.

The present invention also relates to a method of making a powder including agglomerates of hexagonal boron nitride platelets. This method involves providing a briquette formed from agglomerated hexagonal boron nitride platelets, crushing the briquette to produce a powder including hexagonal boron nitride agglomerates and non-agglomerated boron nitride platelets, and removing the non-agglomerated boron nitride platelets from the powder under conditions effective to produce a powder including agglomerates of hexagonal boron nitride platelets, wherein the agglomerates have an agglomerate size distribution of from about 10 to about 125 microns.

Another aspect of the present invention relates to a polymer blend including a polymer and a powder phase. The powder phase includes agglomerates of hexagonal boron nitride platelets, wherein the agglomerates have an agglomerate size distribution of from about 10 to about 125 microns and the powder phase is substantially free of non-agglomerated platelets of boron nitride and wherein the powder phase is distributed homogeneously within the polymer.

The boron nitride powder of the present invention exhibits high thermal conductivity when used as a filler for thermal management applications, e.g., in composites, polymers, and fluids. In addition, the high thermal conductivity of the boron nitride powder of the present invention allows lower loadings, resulting in improved peel strengths of metal films bonded to polymer matrices. Moreover, the boron nitride powder of the present invention reduces viscosity in a boron nitride/polymer mixture, which leads to improved processing and wetting of the boron nitride by the polymer. The resulting boron nitride powder can also be used in composite polymers and metals for friction applications.

DETAILED DESCRIPTION OF THE INVENTION

Figure 1:
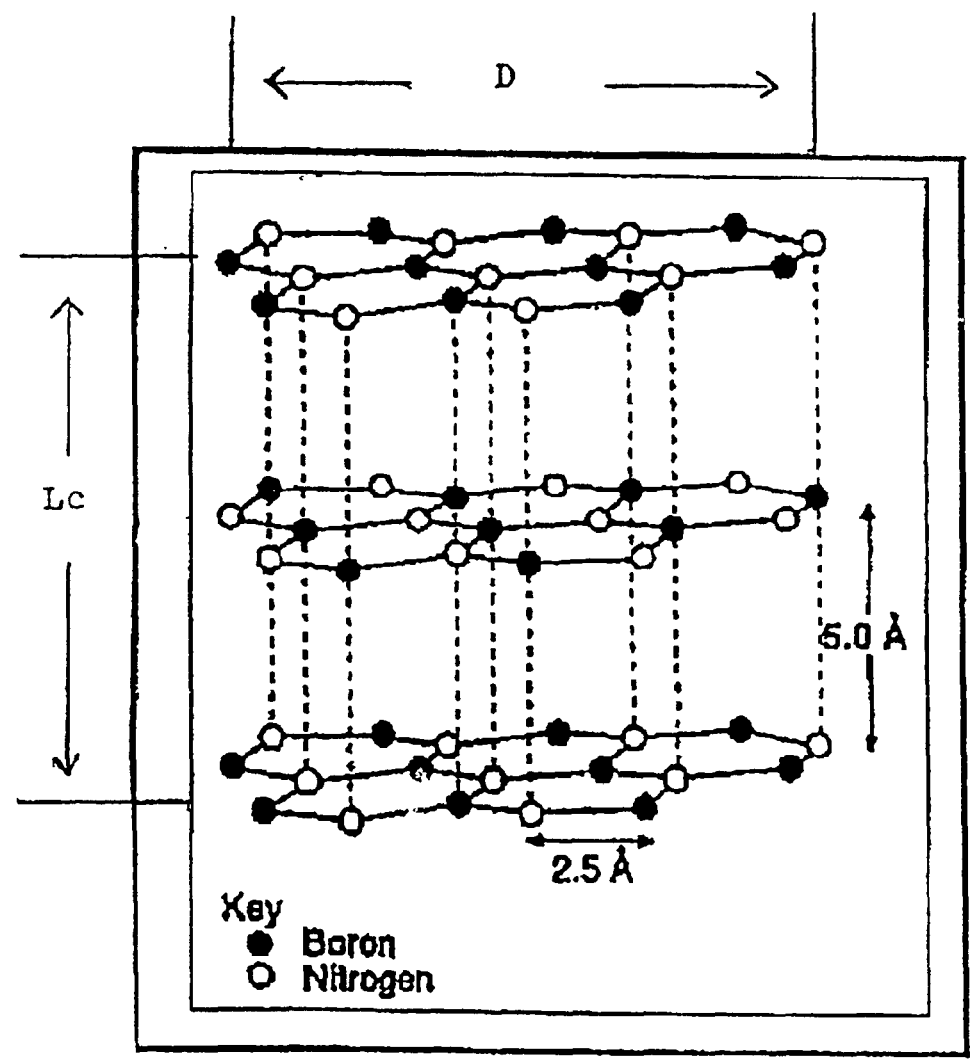
FIG. 1 is a graphic showing the structure of hexagonal boron nitride.

The present invention relates to a powder including agglomerates of hexagonal boron nitride platelets, wherein the agglomerates have an agglomerate size distribution of from about 10 to about 125 microns and the powder is substantially free of non-agglomerated platelets of boron nitride.

Hexagonal boron nitride is an inert, lubricious ceramic material having a platey hexagonal crystalline structure (similar to that of graphite) ("h-BN"). The well-known anisotropic nature of h-BN can be easily explained by referring to FIG. 1, which shows hexagons of a h-BN particle. The diameter of the h-BN particle platelet is the dimension shown as D in FIG. 1, and is referred to as the a-direction. BN is covalently bonded in the plane of the a-direction. The particle thickness is the dimension shown as Lc, which is perpendicular to diameter and is referred to as the c-direction. Stacked BN hexagons (i.e., in the c-direction) are held together only by Van der Waals forces, which are relatively weak.

As used herein, an agglomerate is a collection of boron nitride platelets bonded together. A non-agglomerated boron nitride platelet comprises one or more crystallites.

The powder of the present invention may be a h-BN powder having a highly ordered hexagonal structure. Such powders have a crystallization index (Hubacek, "Hypothetical Model of Turbostratic Layered Boron Nitride," *J. Cer. Soc. of Japan,* 104:695–98 (1996), which is hereby incorporated by reference in its entirety) of at least 0.12 (quantification of highly hexagonal h-BN) and, preferably, greater than 0.15. Preferably, the h-BN powder has a crystallinity of about 0.20 to about 0.55, most preferably, from about 0.30 to about 0.55.

Typically, this powder is produced by a "high fire" treatment of a raw, essentially turbostratic (amorphous) boron nitride powder (see Hagio et al., "Microstructural Development with Crystallization of Hexagonal Boron Nitride," *J. Mat. Sci. Lett.* 16:795–798 (1997), which is hereby incorporated by reference in its entirety) to produce what is conventionally referred to as "high purity hexagonal boron nitride." In a preferred embodiment, a fine turbostratic BN powder briquette having a crystallization index of less than 0.12 is heat treated in nitrogen at about 1400 to 2300° C. for about 0.5–12 hours. This heat treatment typically acts to produce more crystalline h-BN platelets, as the fine, <1 $\mu$m crystallites, of turbostratic powder platelets become more ordered (crystallized) and larger (>1 micron) during the heat treatment. The bulk density of the resulting, heat treated boron nitride briquette is typically between about 0.6 g/cc and 1.0 g/cc. The briquette can be crushed into agglomerates having a size range of about 1 to about 1000 microns.

In a preferred embodiment, the boron nitride powder of the present invention has a tap density of from about 0.35 g/cc to about 0.65 g/cc, more preferably, from about 0.38 g/cc to about 0.55 g/cc, and, most preferably, from about 0.40 g/cc to about 0.52 g/cc.

In yet another embodiment, the h-BN platelets have a surface area of from about 0.5 m$^2$/g to about 5 m$^2$/g, and more preferably, about 2 m$^2$/g to about 4.5 m$^2$/g.

In a preferred embodiment, the agglomerates of h-BN have an agglomerate size distribution of from about 30 to 125 microns (more preferably 74 to 125 microns, most preferably 74 to 105 microns), or 20 to 74 microns (more preferably 38 to 74 microns, most preferably 38 to 53 microns), or 10 to 38 microns (more preferably 20 to 38 microns). As used herein, agglomerate size distribution is the range of agglomerates from the smallest agglomerate present to the largest agglomerate present, as defined by characteristic diameter of the agglomerates, wherein the agglomerates span the range. This is typically measured by laser scattering techniques. Preferably, at least about 90–95%, most preferably, at least about 98% of agglomerates fall within the agglomerate size distribution.

In accordance with the present invention, the powder including agglomerates of h-BN platelets is substantially free of non-agglomerated platelets of boron nitride. As used herein, substantially free means that the non-agglomerated boron nitride platelets are present in the powder in amounts less than about 5%, more preferably, less than about 1%, and, most preferably, less than about 0.1%.

The present invention also relates to a method of making a powder including agglomerates of hexagonal boron nitride platelets. This method involves providing a briquette formed from agglomerated hexagonal boron nitride platelets, crushing the briquette to produce a powder including hexagonal boron nitride agglomerates and non-agglomerated boron nitride platelets, and removing the non-agglomerated boron nitride platelets from the powder under conditions effective to produce a powder including agglomerates of hexagonal boron nitride platelets, wherein the agglomerates have an agglomerate size distribution of from about 10 to about 125 microns.

Preferably, the briquette formed from agglomerated hexagonal boron nitride platelets is provided by heat treating raw boron nitride powder, as described above.

In one embodiment, the platelets of the starting h-BN briquette have an average diameter of from about 2 $\mu$m to about 20 $\mu$m, more preferably between about 2 $\mu$m and 12 $\mu$m, and most preferably, between about 4 $\mu$m and about 12 $\mu$m. As used herein, diameter of the h-BN particle platelet is the dimension shown as D in FIG. 1. This is typically measured by scanning electron microscopy and laser scattering techniques using, e.g., a Leeds & Northrup Microtrac X100 (Clearwater, Fla.).

In another embodiment, the h-BN starting material has an oxygen content of from about 1 wt. % to about 12 wt. %, preferably, from about 3 wt. % to about 8 wt. %.

Suitable methods for crushing the briquette include jaw crushing and roll crushing. The briquette is crushed into agglomerates of boron nitride having a desired agglomerate size or diameter. Preferably, the briquette is crushed into agglomerates of boron nitride of from about 10 microns to about 125 microns.

In accordance with the method of the present invention, non-agglomerated boron nitride platelets are removed from the powder. Such non-agglomerated boron nitride platelets are typically less than 10 microns in size. Preferably, non-agglomerated boron nitride platelets are removed to less than about 5%, more preferably, to less than about 1%, and, most preferably, to less than about 0.1%. Suitable techniques for removing the non-agglomerated platelets include screening, air classifying, and elutriation, (see Chem. Eng. Handbook, Perry & Chilton, 5$^{th}$ Ed., McGraw-Hill (1973), which is hereby incorporated by reference in its entirety). As such removal methods are well known in the art, they will only be discussed briefly herein.

Screening is the separation of a mixture of various sized solid particles/agglomerates into two or more portions by means of a screening surface. The screening surface has openings through which the smaller particles/agglomerates will flow, while the larger particles/agglomerates remain on top. This process can be repeated for both the coarse and small particle/agglomerate size streams, as many times as necessary, through varying screen openings to obtain a classification of particles/agglomerates into a desired particle/agglomerate size range.

Air classifiers rely upon air drag and particle/agglomerate inertia, which depends upon particle/agglomerate size, to facilitate the separation of fine particles/agglomerates from coarse particles/agglomerates.

One design for elutriation is a vertical gravity type elutriator, where fluid flowing up through a column carries fine particles/agglomerates smaller than a critical size. The critical size is determined by the settling velocity of the particle/agglomerate in the fluid.

A desired agglomerate range or agglomerate size distribution (ASD) is determined by the intended use of the resulting boron nitride powder. For example, for compliant interface pads, where the polymer is a low durometer silicone rubber, the desired ASD is such that the coarsest agglomerate diameter is smaller than the thickness of the interface pad. In addition, a plurality. of agglomerate size ranges may be combined in the boron nitride powder.

The method of the present invention produces a low density boron nitride powder which can be used as a filler for thermal management applications, e.g., in composites, polymers, and fluids. Thus, the method of the present invention further includes mixing the powder including agglomerates of hexagonal boron nitride platelets with a polymer to form a polymer blend.

Polymer systems may include melt-processable polymers, polyesters, phenolics, silicone polymers (e.g., silicone rubbers), acrylics, waxes, thermoplastic polymers, low molecular weight fluids, and epoxy molding compounds.

Although not wishing to be bound by theory, it is believed that the elimination of non-agglomerated platelets in the boron nitride powder of the present invention improves the passage of heat through the polymer blend. In particular, it is believed that the removal of non-agglomerated platelets of boron nitride reduces the number of interfaces within the polymer blend, thereby improving the thermal conductivity of the resulting polymer-BN blend.

Another aspect of the present invention relates to a polymer blend including a polymer and a powder phase. The powder phase includes agglomerates of hexagonal boron nitride platelets, wherein the agglomerates have an agglomerate size distribution of from about 10 to about 125 microns and the powder phase is substantially free of non-agglomerated platelets of boron nitride and wherein the powder phase is distributed homogeneously within the polymer.

In one embodiment, the polymer blend comprises from about 15 vol. % to about 40 vol. % powder phase. However, the loading of the powder phase including agglomerates of hexagonal boron nitrides platelets into the polymer blend is determined by numerous factors, including the desired flexibility of the resulting polymer blend, the flowability of the polymer blend, and the thermal conductivity desired. For example, lower loading of the h-BN powder, such as 20 vol. % to 30 vol. %, is desirable for applications requiring improved metal adhesion.

The thermal conductivity of the resulting polymer blend is determined by loading, dispersion, and other factors. In one embodiment, the polymer blend has a thermal conductivity of from about 3.5 W/mK to about 4.0 W/mK.

When the low density h-BN powder of the present invention is incorporated into a polymer, a surprisingly high thermal conductivity results at low loading levels, e.g., between about 20 vol. % and 30 vol. %. The thermal conductivity of the resulting BN filled polymer is higher than other fillers of higher tap density at the same vol. % loading. Having higher thermal conductivity allows lower loadings, which leads to improved peel strengths of metal films bonded to the polymer-BN blend. In addition, the removal of fine BN platelets reduces the viscosity of the BN-polymer mixture, which leads to improved processing and wetting of the BN by the polymer.

EXAMPLES

Example 1

Preparation of Agglomerated Hexagonal Boron Nitride Powder

Approximately 120 lbs. of briquettes comprised of agglomerated crystalline, hexagonal BN were crushed first, utilizing a jaw type crusher, then a roll type crusher (Model 666 "F" Gran-U-Lizer, Modern Process Equipment, Chicago, Ill.). The resulting powder was screened to separate coarse and fine agglomerates. Coarse agglomerates, for the purpose of this example, were above 150 microns and fine agglomerates, below 150 microns. Agglomerates greater than 150 microns in size were re-crushed until they were within the target agglomerate size range, i.e. less than 150 microns, for this example. Approximately 60 lbs. of fine agglomerates were produced during the initial crushing. The ultra-fine agglomerates and platelets produced during crushing (less than about 30 microns) were separated from the fine agglomerates by air classification. The resulting 9 lbs. of air classified product was screened utilizing a multiple deck screener fitted with 145 and 200 mesh TBC (Tensile Bolting Cloth) screens (Kason Corporation, Millburn, N.J.). Screening produced 0.25 lbs. of product with an agglomerate size distribution of about 85% less than 125 microns, but greater than 74 microns, 10% below 74 microns, and less than about 5% below 53 microns.

Example 2

Preparation of Agglomerated Hexagonal Boron Nitride Powder Having a Mean Agglomerate Size of 73 Microns Approximately 100 lbs. of crushed, crystalline, hexagonal BN powder comprised of agglomerates having a maximum agglomerate size of 250 microns and a minimum particle size of 1 micron was air classified. Approximately 20 lbs. of coarse, crystalline, hexagonal powder with a maximum agglomerate size of 210 microns and a minimum agglomerate size of 13 microns was produced. The mean agglomerate size of the air classified coarse agglomerates was 73 microns.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the claims which follow.

What is claimed:

1. A powder comprising agglomerates of hexagonal boron nitride platelets, wherein the agglomerates have an agglomerate size distribution of from about 10 to about 125 microns and the powder is substantially free of non-agglomerated platelets of boron nitride.

2. The powder according to claim 1, wherein the agglomerate size distribution is from about 74 to about 125 microns.

3. The powder according to claim 2, wherein the agglomerate size distribution is from about 74 to about 105 microns.

4. The powder according to claim 1, wherein the agglomerate size distribution is from about 20 to about 74 microns.

5. The powder according to claim 4, wherein the agglomerate size distribution is from about 38 to about 74 microns.

6. The powder according to claim 5, wherein the agglomerate size distribution is from about 38 to about 53 microns.

7. The powder according to claim 1, wherein the agglomerate size distribution is from about 10 to about 38 microns.

8. The powder according to claim 7, wherein the agglomerate size distribution is from about 20 to about 38 microns.

9. The powder according to claim 1, wherein the agglomerates comprise boron nitride platelets having a surface area of from about 1 $m^2/g$ to about 5 $m^2/g$.

10. The powder according to claim 1, wherein the powder has a crystallization index of from about 0.12 to about 0.55.

11. The powder according to claim 10, wherein the powder has a crystallization index of at least 0.2.

12. The powder according to claim 11, wherein the powder has a crystallization index of at least 0.3.

13. A method of making a powder comprising agglomerates of hexagonal boron nitride platelets, said method comprising:

provlding a briquette formed from agglomerated hexagonal boron nitride platelets;

crushing the briquette to produce a powder comprising hexagonal boron nitride agglomerates and non-agglomerated boron nitride platelets; and removing the non-agglomerated boron nitride platelets from the powder under conditions effective to produce a powder comprising agglomerates of hexagonal boron nitride platelets, wherein the agglomerates have an agglomerate size distribution of from about 10 to about 125 microns.

14. The method according to claim 13, wherein said providing comprises heat treating raw boron nitride powder.

15. The method according to claim 13, wherein said removing comprises:

screening the hexagonal boron nitride agglomerates and non-agglomerated boron nitride platelets.

16. The method according to claim 13, wherein the powder comprising agglomerates of hexagonal boron nitride platelets has a crystallization index of from about 0.12 to about 0.55.

17. The method according to claim 16, wherein the powder comprising agglomerates of hexagonal boron nitride platelets has a crystallization index of at least 0.2.

18. The method according to claim 17, wherein the powder comprising agglomerates of hexagonal boron nitride platelets has a crystallization index of at least 0.3.

19. The method according to claim 13 further comprising:

mixing the powder comprising agglomerates of hexagonal boron nitride platelets with a polymer to form a polymer blend.

20. The method according to claim 19, wherein the polymer is a melt-processable polymer.

21. The method according to claim 19, wherein the polymer is selected from the group consisting of polyesters, phenolics, silicone polymers, acrylics, waxes, thermoplastic polymers, low molecular weight fluids, and epoxy molding compounds.

22. A polymer blend comprising:

a polymer, and a powder phase comprising agglomerates of hexagonal boron nitride platelets, wherein the agglomerates have an agglomerate size distribution of from about 10 to about 125 microns and the powder phase is substantially free of non-agglomerated platelets of boron nitride and wherein the powder phase is distributed homogeneously within the polymer.

23. The polymer blend according to claim 22, wherein the polymer is a melt-processable polymer.

24. The polymer blend according to claim 22, wherein the polymer is selected from the group consisting of polyesters, phenolics, silicone polymers, acrylics, waxes, thermoplastic polymers, low molecular weight fluids, and epoxy molding compounds.

25. The polymer blend according to claim 22, wherein the agglomerate size distribution is from about 74 to about 125 microns.

26. The polymer blend according to claim 25, wherein the agglomerate size distribution is from about 74 to about 105 microns.

27. The polymer blend according to claim 22, wherein the agglomerate size distribution is from about 20 to about 74 microns.

28. The polymer blend according to claim 27, wherein the agglomerate size distribution is from about 38 to about 74 microns.

29. The polymer blend according to claim 28, wherein the agglomerate size distribution is from about 38 to about 53 microns.

30. The polymer blend according to claim 22, wherein the agglomerate size distribution is from about 10 to about 38 microns.

31. The polymer blend according to claim 30, wherein the agglomerate size distribution is from about 20 to about 38 microns.

32. The polymer blend according to claim 22, wherein the agglomerates comprise boron nitride platelets having a surface area of from about 1 $m^2/g$ to about 5 $m^2/g$.

33. The polymer blend according to claim 22, wherein the powder phase has a crystallization index of from about 0.12 to about 0.55.

34. The polymer blend according to claim 33, wherein the powder phase has a crystallization index of at least 0.2.

35. The polymer blend according to claim 34, wherein the powder phase has a crystallization index of at least 0.3.

* * * * *